3,077,202
BEER KEG TAP
Hilbert R. Perlick, Elm Grove, Wis., assignor to The Perlick Company, Inc., Milwaukee, Wis., a corporation of Wisconsin
Filed May 25, 1960, Ser. No. 31,675
2 Claims. (Cl. 137—324)

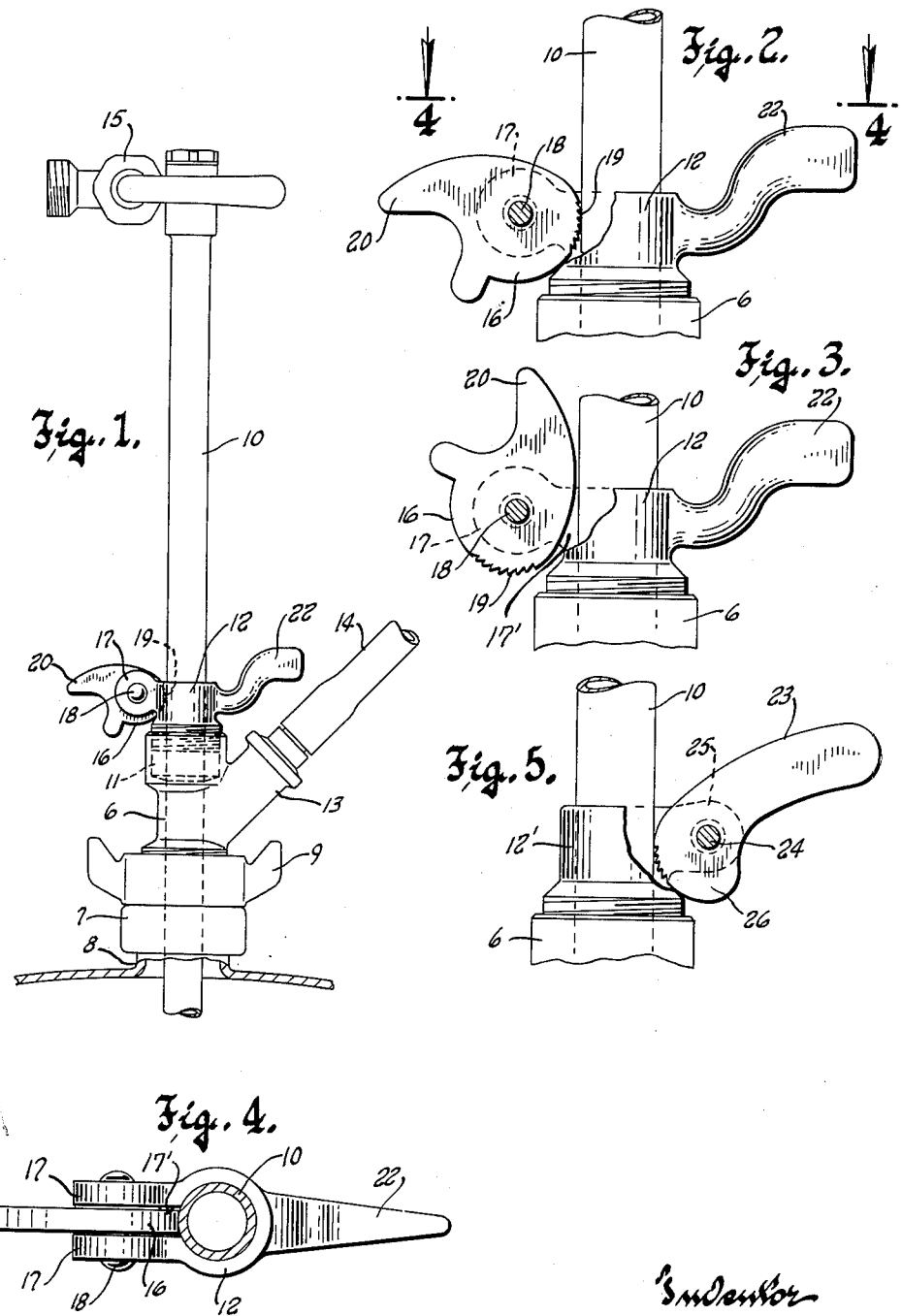

This invention relates to beer keg taps.

The most universally used beer keg tap comprises a tubular body portion adapted to be secured to a keg over its corked tapping hole, and a hollow tap rod passing slidably through the tubular body and adapted to be inserted into the keg by the application of an inward force on the outer end thereof sufficient to dislodge the cork and push it into the keg. To seal the connection between the tap rod and the keg, a rubber gasket is seated in a counterbore in the upper end of the body, and forced into sealing engagement with the tap rod by a packing gland or top nut as it is customarily called, threaded into the counterbore.

Since keg beer is delivered by the brewery at a pressure of approximately 12–14 lbs. at 40° F., the successful tapping of a keg of beer requires quick tightening of the packing gland to seal the connection between the tap rod and the keg. With the packing gland adequately tightened, the rubber gasket not only affords the necessary seal, but also grips the tap rod and holds it in place. No other means has ever before been provided to hold the tap rod in the keg and, as a consequence, there is always the danger that the tap rod will be forcibly ejected from the keg by the pressure therein.

There are many instances on record where persons engaged in tapping a keg of beer have been severely injured by the tap rod being blown out of the keg. This is most apt to happen to a novice who, through inexperience fails to hold the tap rod down while he is tightening the packing gland or top nut, but even in cases where all precautions have been taken, an inadequate grip of the rubber gasket upon the tap rod due perhaps to a loss of elasticity in the gasket, or an excessive internal pressure in the keg caused by agitation in delivery or too high a temperature, has resulted in the rod being forcibly ejected from the keg.

With a view toward overcoming the danger inherent in beer keg taps heretofore available, this invention has as its purpose to provide simple means to positively assure against accidental ejection of the tap rod from the keg, by equipping the beer keg tap with a self-energizing unidirectional clutch means carried by the body thereof and operable to automatically grip the tap rod and secure it against outward movement.

Another object of this invention is to provide a beer keg tap having a self-energizing unidirectional clutch means to grip the tap rod and hold it against outward movement in which this safety feature is so designed and constructed that the attainment of the desired objective is accomplished with a minimum structural change to the existing tap and in which only one of its elements, namely the packing gland or top nut requires any modification whatsoever.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates two complete examples of the physical embodiments of the invention constructed according to the best modes so far devised for the practical application of the principles thereof, and in which:

FIGURE 1 is a view in side elevation of a beer keg tap embodying this invention;

FIGURE 2 is a side elevational view at an enlarged scale and with parts broken away and in section of that portion of the beer keg tap with which this invention is most directly concerned, said view showing the clutch or locking device in its operative condition preventing outward movement of the tap rod;

FIGURE 3 is a view similar to FIGURE 2 but showing the clutch released to permit withdrawal of the tap rod;

FIGURE 4 is a cross sectional view through FIGURE 2 on the plane of the line 4—4; and FIGURE 5 is a view similar to FIGURE 2, but illustrating a slightly modified embodiment of the invention.

Referring now particularly to the accompanying drawing, the numeral 6 designates the tubular body of a conventional beer keg tap which, as is well known, is adapted to be secured to a keg of beer over its corked tapping hole. The manner in which the tap is secured to the keg forms no part of this invention but, for sake of completeness, generally consists of a so-called bottom flange 7 adapted to have a bayonet-like connection with the neck 8 of a beer keg and a non-rotatable connection with the bottom of the body.

A wing nut 9 threaded onto the bottom end of the body secures the body to the bottom flange and tightens the connection between the bottom flange and the neck of the keg.

A uniform diameter tap rod 10 is slidably received by the body and is adapted to be projected down through the body and into the keg during the tapping operation. To effect this result, a downward or inward force great enough to dislodge the cork (not shown) and push it into the keg, is applied to the top or outer end of the tap rod.

The upper end of the body is counterbored and receives a rubber gasket 11 which, of course, encircles the tap rod and which is forced into tight sealing engagement with the tap rod by a packing gland 12, usually called the top nut and which is threaded into the counterbore in the top of the body.

A tubular branch 13 projects at an angle from one side of the body to have a hose 14 connected thereto and by which $CO_2$ gas may be fed to the keg to maintain a predetermined pressure on the beer in the keg, and also to carbonate the beer slightly. Obviously, of course, the outer or upper end of the tap rod carries the customary faucet 15 by which the rod may be connected to the beer dispensing facilities.

Heretofore, the only means provided for holding the tap rod down in the keg against the pressure therein was the grip applied thereon by the rubber gasket. If the top nut 12 is tightened down sufficiently and the rubber gasket has the required elasticity, this manner of securing the tap rod in place is generally adequate, but as noted hereinbefore, it has also been the source of very serious accidents.

An experienced person will hold the tap rod down as he tightens the packing gland or top nut, but a novice will often let go of the tap rod while he is tightening the packing gland or top nut, and before he can tighten it sufficiently, the pressure inside the keg forcibly ejects the tap rod. Since this pressure may be as high as 20 to 25 p.s.i. under some adverse conditions, it is obvious that if the person tapping the keg has the misfortune of having his face above or in line with the tap rod, its forcible ejection from the keg will result in serious injury.

The present invention provides an ingenious and extremely simple safety device which entirely eliminates the likelihood of the tap rod being blown out of the keg. It consists simply of a self-energizing clutch means carried by the body or, more specifically, the packing gland 12 or top nut, and engaging the side of the tap rod in such a way that any slight outward movement of the rod tightens the grip of the clutch on the rod.

Specifically, this self-energizing unidirectional clutch consists of an eccentric cam 16 received between a pair of ears 17 projecting laterally from the packing gland or top nut 12 at opposite sides of a slot 17' radially through the wall thereof, and pivoted to said ears by a pin 18 which has its ends secured in the ears and passes freely through a bore in the cam.

The cam is so shaped that upon rotation thereof about the pin 18, a toothed peripheral edge portion 19 thereof which projects into the bore of the packing gland or top nut comes into gripping engagement with the adjacent side of the tap rod; and to provide the self-energizing feature, the toothed periphery 19 is progressively farther from the axis of rotation in the direction upward movement of the tap rod tends to turn the cam when the cam is engaged therewith.

An outwardly directed finger or lever 20 on the cam, by its weight, normally biases the cam to its operative position, and also provides a convenient finger grip by which the cam may be lifted or moved out of operative position, providing, of course, that its grip upon the tap rod has been first released by slight inward movement of the rod.

In the preferred embodiment of the invention, the ears 17 between which the eccentric cam is pivoted, are diametrically opposite a handle 22 with which the top nut is customarily equipped so that the finger or lever 20 and the handle 22 together provide means through which torque may be applied to the packing gland. This arrangement has been found entirely satisfactory and convenient, but, if desired, the eccentric cam and the handle for imparting torque to the top nut may be combined, as shown in FIGURE 5. In this case, the packing gland or top nut 12' has a bell crank shaped lever 23 mounted thereon by means of a pin 24 having its ends fixed in a pair of ears 25 projecting laterally from the nut. The short arm 26 of the bell crank provides the self-energizing eccentric cam and, of course, the long arm serves as the handle by which torque may be applied to the nut.

From the foregoing description taken in connection with the accompanying drawing, it will be readily apparent to those skilled in this art that this invention eliminates a serious hazard heretofore inherent in beer keg taps, by its provision of means to automatically secure the tap rod against accidental ejection from the keg, either during the act of tapping the keg or after the keg has been tapped.

What is claimed as my invention is:

1. In a beer keg tap having a tubular body, means to secure the body to a keg over a corked tapping hole therein, a hollow tap rod slidably received in the body, a gasket seated in the upper end of the body and encircling the tap rod, and a packing gland encircling the tap rod and threaded to the body to force the gasket into sealing engagement with the tap rod, the improvement which comprises: means to prevent accidental ejection of the tap rod, said means comprising an eccentric cam carried by the packing gland and rotatable about an axis fixed with respect to the axis of the tap rod, with the peripheral edge of the cam engaging the adjacent side of the tap rod and being progressively farther from the axis of rotation of the cam in the direction outward movement of the tap rod tends to rotate the cam so that the grip of the cam on the tap rod tightens in consequence of any outward movement of the tap rod; a handle projecting outwardly from the packing gland at the side thereof opposite the eccentric cam; and a finger grip projecting outwardly from the cam, the finger grip and the handle cooperating to provide means by which the packing gland may be turned to compress the gasket.

2. A tapping device comprising: a tubular body having means to secure the same to a container of pressurized liquid over a corked tapping hole therein, the outer end portion of the body being counterbored and internally threaded; a uniform diameter hollow tap rod slidably received in said body; a gasket encircling the tap rod and seated in the bottom of the counterbore; and a unitary structure for clamping the gasket into sealing engagement between the tap rod and the tubular body and for preventing accidental ejection of the tap rod, comprising a tubular packing gland having a bore in which the tap rod is slidably received and threaded into the counterbore to compress the gasket between its inner end and the bottom of the counterbore, the outer end portion of the packing gland having a slot extending substantially radially through its wall, an eccentric cam in said slot, means pivotally mounting the cam on the packing gland for rotation about an axis transverse to the axis of the tap rod with the inner peripheral edge of the cam projecting into the bore in the packing gland to engage the tap rod, said inner edge of the cam being progressively farther from the axis of rotation of the cam in the direction outward movement of the tap rod tends to rotate the cam so that the grip of the cam on the tap rod tightens in consequence of any outward movement of the tap rod, and an outward projection on the cam protruding from the slot in the wall of the tubular packing gland by which the cam may be actuated to release its grip upon the tap rod and torque may be applied to the packing gland.

References Cited in the file of this patent

UNITED STATES PATENTS

| 800,584 | Leslie | Sept. 26, 1905 |
| 2,790,572 | Flaith | Apr. 30, 1957 |
| 2,830,611 | Stelma | Apr. 15, 1958 |